US007640539B2

(12) United States Patent
Alexander, III et al.

(10) Patent No.: US 7,640,539 B2
(45) Date of Patent: Dec. 29, 2009

(54) INSTRUCTION PROFILING USING MULTIPLE METRICS

(75) Inventors: William Preston Alexander, III, Austin, TX (US); Scott Thomas Jones, Austin, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 11/104,257

(22) Filed: Apr. 12, 2005

(65) Prior Publication Data

US 2006/0230390 A1 Oct. 12, 2006

(51) Int. Cl.
*G06F 9/44* (2006.01)
*G06F 11/00* (2006.01)

(52) U.S. Cl. ....................... 717/130; 717/128; 717/158; 714/38; 714/45; 714/47

(58) Field of Classification Search ....................... None
See application file for complete search history.

(56) References Cited

U.S. PATENT DOCUMENTS

| | | | | |
|---|---|---|---|---|
| 5,355,484 | A | 10/1994 | Record et al. | |
| 5,768,500 | A * | 6/1998 | Agrawal et al. | 714/47 |
| 6,223,338 | B1 * | 4/2001 | Smolders | 717/128 |
| 6,230,313 | B1 * | 5/2001 | Callahan et al. | 717/128 |
| 6,240,544 | B1 | 5/2001 | Kaneko | |
| 6,401,240 | B1 | 6/2002 | Summers | 717/130 |
| 6,513,155 | B1 | 1/2003 | Alexander, III et al. | 717/124 |
| 6,658,416 | B1 | 12/2003 | Hussain et al. | |
| 6,678,883 | B1 | 1/2004 | Berry et al. | |
| 6,708,169 | B1 | 3/2004 | Berry et al. | |
| 6,735,758 | B1 | 5/2004 | Berry et al. | |
| 6,751,583 | B1 | 6/2004 | Clarke et al. | 703/17 |
| 6,754,889 | B1 | 6/2004 | Leverenz | |
| 6,766,511 | B1 | 7/2004 | Berry et al. | 717/128 |
| 6,928,639 | B2 | 8/2005 | Juan et al. | |
| 6,988,263 | B1 | 1/2006 | Hussain et al. | |
| 7,065,749 | B2 | 6/2006 | Watanabe | |

(Continued)

OTHER PUBLICATIONS

Alexander, III et al., System and Method for Collecting a Plurality of Metrics in a Single Profiling Run of Computer Code.

(Continued)

*Primary Examiner*—Michael J. Yigdall
(74) *Attorney, Agent, or Firm*—Yee & Associates, P.C.; Diana R. Gerhardt

(57) ABSTRACT

A system and method for collecting a plurality of metrics during a single run of a computer program. The mechanism of the present invention initializes a plurality of counters to count events associated with metrics of interest. The mechanism of the present invention then counts the occurrence of events associated with metrics of interest during a single execution of a computer program. Responsive to a determination that a counter in a plurality of counters has generated an interrupt, the interrupt is rerouted to an interrupt handler, wherein the interrupt handler generates trace records comprising trace information corresponding to the interrupt. The mechanism of the present invention then generates profiles for the trace records, wherein the profiles differentiate the trace records based on the metric type associated with each trace record.

18 Claims, 7 Drawing Sheets

U.S. PATENT DOCUMENTS

| | | | | |
|---|---|---|---|---|
| 7,093,234 | B2 | 8/2006 | Hibbeler et al. | |
| 7,194,400 | B2 | 3/2007 | Gabele et al. | |
| 2001/0054175 | A1 | 12/2001 | Watanabe | |
| 2002/0019969 | A1 | 2/2002 | Hellestrand et al. | 716/5 |
| 2003/0191621 | A1 | 10/2003 | Gabele et al. | |
| 2004/0064685 | A1 | 4/2004 | Nguyen et al. | |
| 2004/0111708 | A1 | 6/2004 | Calder et al. | 717/131 |
| 2005/0091643 | A1 | 4/2005 | Ekanadham et al. | |

OTHER PUBLICATIONS

Alexander, III et al., Method and Apparatus for Removal of Asynchronous Events in Complex Application Performance Analysis, Feb. 12, 2004.

Dewitt, Jr. et al., Method and Apparatus for Autonomic Detection of Cache "Chase Tail" Conditions and Storage of Instructions/Data in "Chase Tail" Data Structure, Jan. 14, 2004.

Hussain et al., Apparatus and Method for Cataloging Symbolic Data for Use in Performance Analysis of Computer Programs, Jul. 10, 2000.

* cited by examiner 810 820 830

FIG. 8A

| | | |
|---|---|---|
| EVENT TYPE 1 | TIMESTAMP T1 | MEMORY ADDRESS A1 |
| EVENT TYPE 3 | TIMESTAMP T2 | MEMORY ADDRESS A11 |
| EVENT TYPE 2 | TIMESTAMP T3 | MEMORY ADDRESS A45 |
| ⋮ | ⋮ | ⋮ |
| EVENT TYPE 8 | TIMESTAMP TX-1 | MEMORY ADDRESS AZ |
| EVENT TYPE 6 | TIMESTAMP TX | MEMORY ADDRESS AY |

| | | |
|---|---|---|
| EVENT TYPE 1 | CHANGE VALUE V1 | MEMORY ADDRESS A1 |
| EVENT TYPE 2 | CHANGE VALUE V2 | MEMORY ADDRESS A2 |
| EVENT TYPE 3 | CHANGE VALUE V3 | MEMORY ADDRESS A3 |
| EVENT TYPE 4 | CHANGE VALUE V4 | MEMORY ADDRESS A4 |
| EVENT TYPE 5 | CHANGE VALUE V5 | MEMORY ADDRESS A5 |
| EVENT TYPE 6 | CHANGE VALUE V6 | MEMORY ADDRESS A6 |
| ⋮ | ⋮ | ⋮ |

| | | | | |
|---|---|---|---|---|
| ADDRESS A1 | ADDRESS B1 | CHANGE VALUE V1 | CHANGE VALUE W1 | CHANGE VALUE X1 |
| ADDRESS A2 | ADDRESS B2 | CHANGE VALUE V2 | CHANGE VALUE W2 | CHANGE VALUE X2 |
| ADDRESS A3 | ADDRESS B3 | CHANGE VALUE V3 | CHANGE VALUE W3 | CHANGE VALUE X3 |
| ADDRESS A4 | ADDRESS B4 | CHANGE VALUE V4 | CHANGE VALUE W4 | CHANGE VALUE X4 |
| ADDRESS A5 | ADDRESS B5 | CHANGE VALUE V5 | CHANGE VALUE W5 | CHANGE VALUE X5 |
| ADDRESS A6 | ADDRESS B6 | CHANGE VALUE V6 | CHANGE VALUE W6 | CHANGE VALUE X6 |
| ⋮ | ⋮ | ⋮ | ⋮ | ⋮ |

INSTRUCTION PROFILING USING MULTIPLE METRICS

GOVERNMENT RIGHTS

This invention was made with Government support under NBCH30390004, PERCS project. THE GOVERNMENT HAS CERTAIN RIGHTS IN THIS INVENTION.

CROSS REFERENCE TO RELATED APPLICATIONS

This application is related to commonly assigned and co-pending U.S. patent application Ser. No. 11/104,323 (pending) entitled “System and Method for Collecting a Plurality of Metrics in a Single Profiling Run of Computer Code” filed even data herewith, and which is hereby incorporated by reference.

BACKGROUND OF THE INVENTION

1. Technical Field

The present invention is generally directed to an improved data processing system. More specifically, the present invention is directed to a system and method for performing profiling of the execution of a portion of computer code to allow for collection of a plurality of metrics during a single profiling run 2. Description of Related Art In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating “hot spots.” Ideally, one would like to isolate such hot spots at the instruction and/or source line of code level in order to focus attention on areas which might benefit most from improvements to the code.

Another trace technique involves periodically sampling a program’s execution flows to identify certain locations in the program in which the program appears to spend large amounts of time. This technique is based on the idea of periodically interrupting the application or data processing system execution at regular intervals, so-called sample-based profiling. At each interruption, this trace technique records information for a predetermined length of time or for a predetermined number of events of interest. For example, the program counter of the currently executing thread, which is an executable portion of the larger program being profiled, may be recorded at each interval. This analysis may allow for resolving the recorded values against a load map and symbol table information for the data processing system at post-processing time and for obtaining a profile of where the time is being spent.

Typically, known performance tools are capable of monitoring and analyzing the performance of a data processing system and the applications executing within the data processing system with regard to a single metric, e.g., CPU cycles, number of instructions, etc. That is, each metric of interest requires a single run of an application or program being traced. Thus, in a first run of the program, the performance tool may measure a first metric. In order to obtain performance information for an application with regard to another metric, the application must be run again with a performance tool that is capable of monitoring the application with regard to this other metric.

When applied to simulations, monitoring performance data and tracing the execution of such simulations may take large amounts of time. In fact, some simulations may take multiple days to complete. Typically, it is desired that performance data with regard to a plurality of different metrics be obtained from such simulations. However, with known systems, such performance data collection, tracing, and post processing to produce sampled base reports or reports by subroutine roll ups can only be performed with regard to single metrics per run of the simulation. As a result, multiple runs of a simulation are necessary to obtain all of the desired reports. This greatly increases the time and expense in obtaining the reports needed for performance analysis, verification, and the like.

Thus, it would be beneficial to have a system and method for collecting a plurality of metrics in a single profiling run of a computer code.

SUMMARY OF THE INVENTION

The present invention provides a system and method for collecting a plurality of metrics during a single run of a computer program. The mechanism of the present invention initializes a plurality of counters to count events associated with metrics of interest. The mechanism of the present invention then counts the occurrence of events associated with metrics of interest during a single execution of a computer program. Responsive to a determination that a counter in a plurality of counters has generated an interrupt, the interrupt is rerouted to an interrupt handler, wherein the interrupt handler generates trace records comprising trace information corresponding to the interrupt. The mechanism of the present invention then generates profiles for the trace records, wherein the profiles differentiate the trace records based on the metric type associated with each trace record.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8A illustrates an example of the trace records generated for exemplary embodiments of the present invention in which the trace record is generated in response to a counter overflow generating an interrupt;

FIG. 8B illustrates an exemplary trace record for an embodiment of the present invention in which trace records are generated in response to a timer interrupt;

FIG. 8C illustrates an exemplary trace record for an embodiment of the present invention in which trace records are generated for every branch taken in an application under trace;

DETAILED DESCRIPTION OF THE PREFERRED EMBODIMENTS

The present invention provides trace tools with functionality for using a plurality of counters to count events associated with a plurality of metrics during a single run of a computer program. In one exemplary embodiment, the counters generate interrupts when a maximum value of the counter is reached. The interrupts cause the trace tools to generate trace records identifying the event type associated with the counters that generate the interrupts. Thereafter, a post-processing mechanism may sort the trace records into sets of trace records based on the event type to thereby generate separate profiles for each metric of interest.

In another embodiment, the mechanism of the present invention uses a timer to reset the values of the counters to a maximum value when the timer's time interval is reached. By setting the counters to their maximum value, the occurrence of a next event of the type counted by the counters causes the counters to generate an interrupt. An interrupt handler handles the interrupt and then generates a trace record identifying the event type corresponding to the counter that generated the interrupt.

In a further embodiment, the mechanism of the present invention generates trace records every time a branch is taken. For a branch taken, the trace records are those only used for instruction trace processing. For illustrative purposes, the trace tool generates a single trace record for each branch taken. This trace record contains all of the metrics for that branch taken. Many different variations could be implemented, for example, the trace tool may issue one or more separate trace record(s) for only those metrics that changed or the trace tool may record the full value of the metric instead of the changes. In some embodiments, the required information may be compressed, for example, both the from and to branch addresses may not be required if the number of instructions or distance from the last branch is recorded instead. Each trace record allows for the identification of the changed counters and the amount of the change since a last observation of the value of each of the changed counters. Post-processing may use this information to separate out trace records into sets of trace records based on event type and to generate separate callstack trees for each metric based on the separate sets of trace records.

Figure 1:
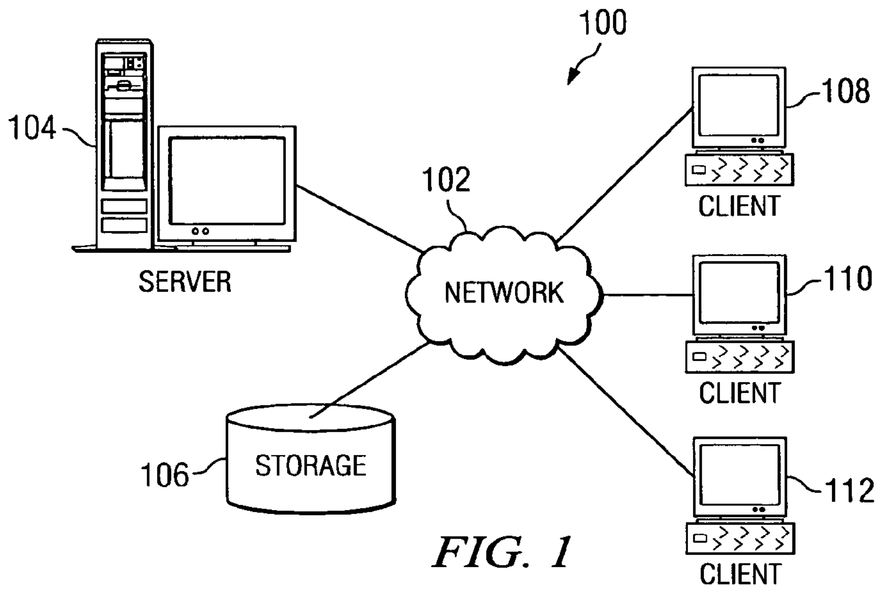
FIG. 1 is an exemplary pictorial representation of a distributed data processing system in which the present invention may be implemented.
Figure 2:
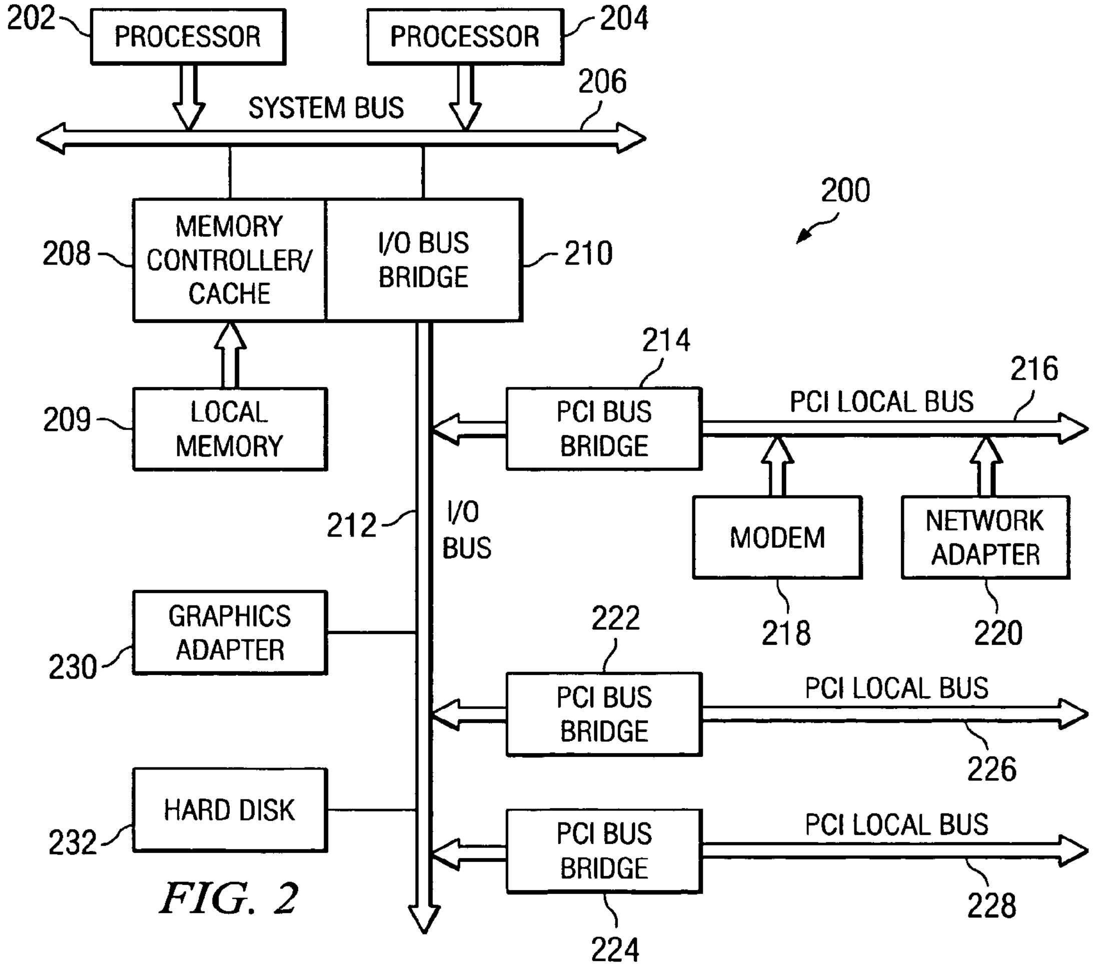
FIG. 2 is an exemplary block diagram of a server data processing system in which aspects of the present invention may be implemented.
Figure 3:
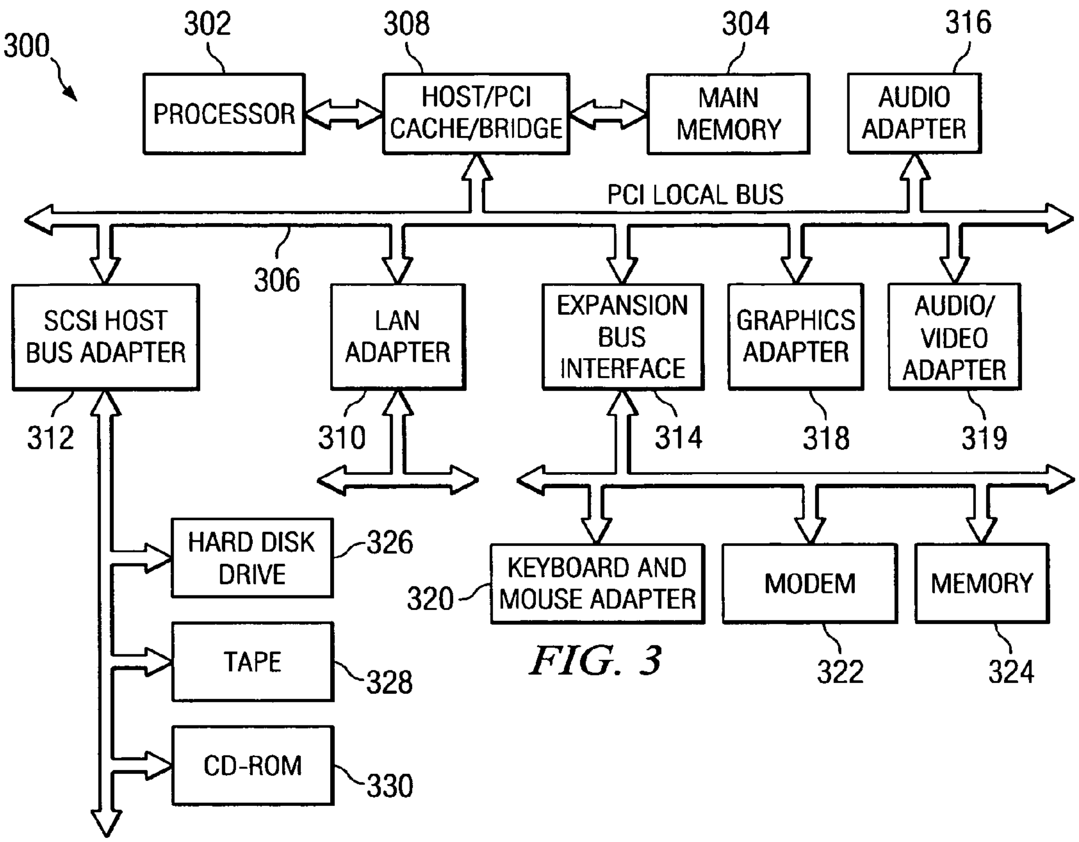
FIG. 3 is an exemplary block diagram of a stand-alone or client data processing system in which aspects of the present invention may be implemented.

The present invention may be implemented in a distributed data processing environment or in a single data processing device. Therefore, the following FIGS. 1-3 are provided as exemplary environments in which aspects of the present invention may be implemented. FIGS. 1-3 are only exemplary and are not intended to state or imply any limitation with regard to the types of data processing environments in which the present invention may be implemented. Many modifications to the exemplary environments depicted may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The mechanism of the present invention performs traces of program execution to obtain performance and trace data for analysis. The present invention makes use of a plurality of counters for counting various metrics during the execution and tracing of the program. These counters increment as events associated with these various metrics occur during the execution of the program. When the counters achieve a particular value, e.g., when the counters overflow, the counters generate an interrupt which is sent to a performance monitoring tool, e.g., a trace program. The trace program outputs a trace record to a trace buffer or trace file that identifies the trace information of interest for the particular event associated with the counter that generated the interrupt. A timer then resets the counters and execution of the program continues.

A post-processor application that is capable of separating out trace profiles for different event/metric types processes the generated trace buffer or trace file records. Thus, the post-processor application may take a single trace buffer or trace file representation of the trace of the computer program that has a mixture of event/metric-based records, and generate separate trace profiles for each event/metric. In this way, a single run of the application under trace may generate trace profiles for a plurality of events/metrics of interest. Post-processing options allow any metric to be chosen for roll up by subroutine, so that post-processing may generate arcflow reports, such as those described in "A Unifying Approach to Performance Analysis in the Java Environment", IBM Systems Journal, Vol. 39, No. 1, 2000, pgs. 118-134, for any metric.

Figure 4:
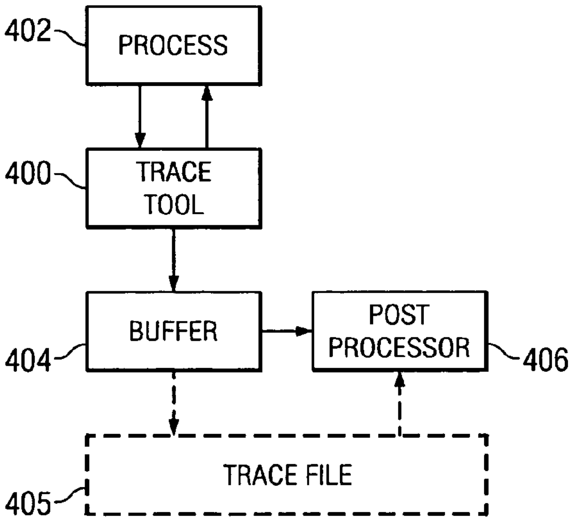
FIG. 4 is an exemplary block diagram depicting components used to perform performance traces of processes in a data processing system.

With reference now to FIG. 4, a block diagram depicts components used to perform performance traces of processes in a data processing system. Trace tool 400 profiles process 402, which may be a process in an application being traced. Trace tool 400 records data upon the execution of a hook, which is a specialized piece of code at a specific location in a routine or program in which other routines may be connected. Trace hooks are typically inserted for the purpose of debugging, performance analysis, or enhancing functionality. These trace hooks send trace data to trace tool 400, which stores the trace data in buffer 404.

The trace data in buffer 404 may be subsequently stored in trace file 405 or a consolidated buffer when buffer 404 is filled for post-processing. Alternatively, the trace data may be processed in real-time. Post-processor 406 processes the trace data located in either buffer 404 or trace file 405. Post-processor 406 processes the trace data to generate an indexed database of symbolic data for loaded modules, as described more fully hereafter.

In a non-Java environment, trace hooks may aid in the identification of modules that are used in an application under trace. With Java operating systems, trace hooks may aid in identifying loaded classes and methods.

In addition, since a class loader may load and unload classes and modules in a Java environment, trace data may also identify these changes. This is especially relevant with "network client" data processing systems, such as those that may operate under Java OS, since the loading and unloading of classes and jitted methods may occur frequently due to the constrained memory and role as a network client. Note that class or module load and unload information are also relevant in embedded application environments, which tend to be memory constrained.

Figure 5:
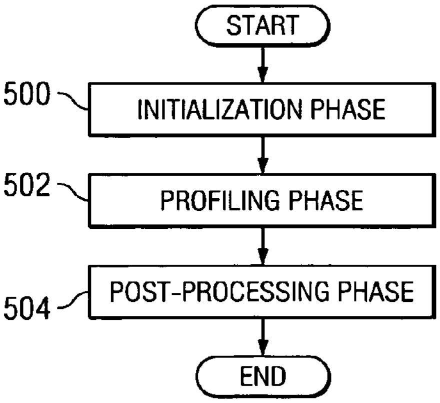
FIG. 5 is a diagram depicting various phases in performing a performance trace of the workload running on a system.

With reference now to FIG. 5, a diagram depicts various phases in performing a performance trace of the workload running on a system. Subject to memory constraints, the generated trace output may be as long and as detailed as the analyst requires for the purpose of profiling a particular program.

An initialization phase 500 captures the state of the client machine at the time a performance tool initiates tracing. This trace initialization data includes trace records that identify all existing threads, all loaded classes (modules), and all methods (sections) for the loaded classes (modules). The trace tool writes records for trace data captured from hooks to a trace file or trace buffer to indicate thread switches, interrupts, and loading and unloading of classes (modules) and "jitted" methods (sections).

Any loaded class (module) has trace records that indicate the name of the class (module) and its methods (sections). The trace records may also contain numeric IDs (identifiers for threads, classes, and methods) associated with the names of the loaded classes output in the trace records. Trace records indicate when all of the start up information has been written.

During the profiling phase 502, the trace tool writes trace records to a trace buffer or trace file. In the present invention, a trace buffer may have a combination of types of records, such as those that may originate from a trace hook executed in response to a particular type of event, e.g., when a branch is taken, and those that may originate from a stack walking function executed in response to a timer interrupt, e.g., a stack unwind record, also called a call stack record.

For example, the following operations may occur during the profiling phase if the user of the profiling utility requests sample-based profiling information. Each time a particular type of timer interrupt occurs, the trace tool writes a trace record, which indicates the system program counter used in identifying the routine that is interrupted. In the depicted example, a timer interrupt initiates gathering of trace data. Of course, other types of interrupts, such as interrupts based on a programmed performance monitor event or other types of periodic events, may be used other than timer interrupts.

In the post-processing phase 504, the post-processing application processes the data collected in the trace buffer or sent to a trace file or a consolidated buffer if the trace buffer is filled for post-processing. In one configuration, the file may be sent to a server, which determines the profile for the processes on the client machine. Of course, depending on available resources, a client machine may perform this post-processing step.

The present invention may be implemented with either a sample based profiling tool, an event-based profiling tool, or any combination profiling tool that uses both sample based and event based profiling. An event based profiling tool operates similar to the operation described above with regard to FIG. 4 and the use of trace hooks to generate trace records when a branch is taken. A sample based profiling tool operates similar to the operation discussed above with regard to timer based profiling tools that write trace records in response to timer interrupts.

In particular, in one exemplary embodiment of the present invention, the trace tool 400 of the present invention is implemented as an enhanced version of the tprof trace tool available from International Business Machines Corporation of Armonk, N.Y. It should be appreciated that, while the preferred embodiments of the present invention may be described in terms of an improved version of the tprof trace tool, the present invention is not limited to use with the tprof trace tool. Rather, any sample-based or event based trace tool may be augmented with the mechanisms of the present invention in order to permit monitoring of multiple metrics in a single profiling run of an application, as will be apparent to those of ordinary skill in the art in view of this description, without departing from the spirit and scope of the present invention.

The tprof trace tool is a timer profiler, which ships with the Advanced Interactive Executive (AIX) operating system from International Business Machines (IBM) Corporation. This program takes samples, which are initiated by a timer. Upon expiration of a timer, tprof identifies the instruction executed. Tprof is a CPU trace tool for use in system performance analysis. The tprof tool provides a sampling technique encompassing the following steps: interrupt the system periodically by time or performance monitor counter (discussed hereafter); determine the address of the interrupted code along with process id (pid) and thread id (tid); record a TPROF hook in the software trace buffer; and return to the interrupted code.

In a typical use, while running an application of interest, the tprof trace tool wakes up every N milliseconds and records exactly where (e.g., at what memory address) the application is executing. If the tprof trace tool performs this step thousands of times, the tprof trace tool may generate an accurate profile of where the application is spending time, i.e. where the hotspots are, which informs those viewing the trace information where to attempt improvements in performance of the application. In other uses of the tprof trace tool, the tprof tool wakes up after every Nth occurrence of a hardware event, such as a level 1 data cache miss. The resulting records generated by the tprof tool identifies which modules in the application are causing the most cache misses and application developers may then attempt to modify the application to improve its performance with regard to cache misses.

It is important to note, however, that prior to the present invention, the tprof trace tool has only been able to be configured to operate in conjunction with a single metric, e.g., time, level 1 cache misses, etc. If there is a need to obtain information for a plurality of metrics, the application must be run repeatedly with the tprof trace tool reconfigured for each metric of interest, one metric per run of the application. Running the application repeatedly takes additional time of course, but also, unless the application is perfectly deterministic, apparent correlations between two sets of events recorded by the trace tool cannot be made with certainty.

In a preferred embodiment, the mechanism of the present invention provides an improved tprof trace tool that operates to generate trace records associated with a plurality of metrics in a single run of the application being traced. This improved tprof trace tool provides multiple counters for counting events associated with different metrics of interest (e.g., one counter associated with a number of level 1 cache misses, a second counter associated with branch mispredictions, etc.)

The mechanism of the present invention augments the tprof trace tool to include functionality for associating criteria with each counter as to when the counter will generate an interrupt resulting in the tprof trace tool outputting a trace record to a trace buffer and/or trace file. The criteria may be the same or different for each counter. Thus, the tprof trace tool may generate a different number of records for each type of metric. Moreover, the tprof trace tool may use a timer-based criteria to determine when to generate trace records to thereby ensure the same number of trace records for each metric. Each of these mechanisms will be described in greater detail hereafter.

In another exemplary embodiment of the present invention, the trace tool 400 may be a sample-based or event based trace tool, such as the itrace tool available from International Business Machines Corporation of Armonk, N.Y. The present invention augments the itrace tool to include the ability to obtain performance data for a plurality of metrics during a single performance monitoring run of a computer program. The itrace tool outputs a trace record every time the application under trace takes a branch. The trace record consists of a memory address and the number of instructions that have been executed since the last recorded branch taken. The mechanism of the present invention processes these trace records into a tree of callstacks annotated with exactly how many instructions are executed in each callstack configuration. The process used to generate this tree of callstacks is referred to as "arcflow." Co-pending and commonly assigned U.S. patent application Ser. No. 10/777,909, entitled "Method and Apparatus for Removal of Asynchronous Events in Complex Application Performance Analysis" filed on Feb. 12, 2004, and which is hereby incorporated by reference, provides examples of the itrace and arcflow tools.

It is important to note that, prior to the present invention, the itrace and arcflow tools have only recorded and processed trace records for a single metric at a time, i.e. number of instructions. If one desires multiple metrics, it is necessary to run the itrace and arcflow tools multiple times, one for each metric of interest. This leads to the same problems noted above with regard to the tprof tool.

In addition, the itrace tool has an extra consideration with regard to calibration. When the itrace tool generates a trace record, for example, a routine exit, the routine may not execute some of the instructions since entry to that routine, but rather the itrace tool may execute these instructions. Therefore, in order to get accurate information about the application, it is necessary to determine how many instructions the itrace tool executed so they may be subtracted from the number of instructions itrace records as being executed since a last branch taken. A "number of instructions" metric determines the number of executed instructions quite accurately. However, for other metrics, such as cache misses, branch mispredictions, etc., such determinations cannot be made easily using real hardware. The simulation environment may calculate these other metrics accurately and thus these metrics may be quite valuable.

One exemplary embodiment of the present invention provides a mechanism that augments the itrace tool, i.e. an event-based trace tool, such that the trace records generated include information for a plurality of different metrics. This improvement to the itrace tool permits the itrace tool to obtain metric information from a plurality of counters that are configured to count events associated with a variety of metrics. A post-processing mechanism generates a plurality of different trace profiles for each metric based on the metric information stored in each of the trace records for each of the plurality of metrics.

Figure 6:
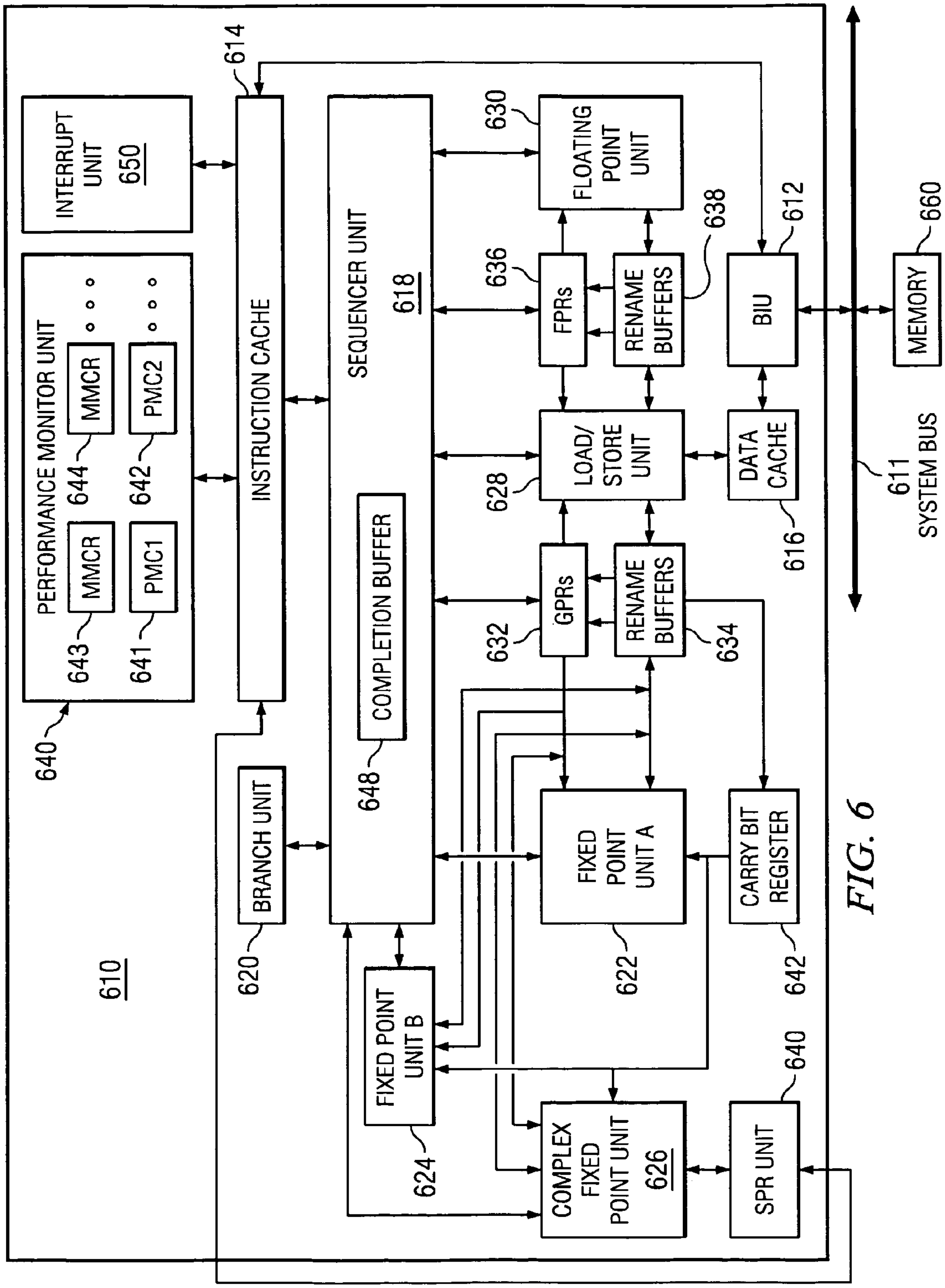
FIG. 6 is a block diagram of a processor system for processing information according to the preferred embodiment.

Turning next to FIG. 6, a block diagram of a processor system for processing information is depicted in accordance with a preferred embodiment of the present invention. FIG. 6 illustrates an exemplary embodiment of the present invention in which hardware performance monitor counters implement the counters for counting events associated with a plurality of metrics as in a processor 610. However, it should be appreciated that software-based counters may also implement the counters of the present invention. Moreover, the present invention may use any combination of hardware and software counters without departing from the spirit and scope of the present invention.

Processor 610 may be implemented as processor 202 in FIG. 2. In a preferred embodiment, processor 610 is a single integrated circuit superscalar microprocessor. Accordingly, as discussed further herein below, processor 610 includes various units, registers, buffers, memories, and other sections, all of which are formed by integrated circuitry. Also, in the preferred embodiment, processor 610 operates according to reduced instruction set computer ("RISC") techniques. As shown in FIG. 6, a connection exists between system bus 611 and bus interface unit ("BIU") 612 of processor 610. BIU 612 controls the transfer of information between processor 610 and system bus 611.

A connection also exists between BIU 612, instruction cache 614, and data cache 616 of processor 610. Instruction cache 614 outputs instructions to sequencer unit 618. In response to such instructions from instruction cache 614, sequencer unit 618 selectively outputs instructions to other execution circuitry of processor 610.

In addition to sequencer unit 618, in the preferred embodiment, the execution circuitry of processor 610 includes multiple execution units, namely a branch unit 620, a fixed-point unit A ("FXUA") 622, a fixed-point unit B ("FXUB") 624, a complex fixed-point unit ("CFXU") 626, a load/store unit ("LSU") 628, and a floating-point unit ("FPU") 630. FXUA 622, FXUB 624, CFXU 626, and LSU 628 input their source operand information from general-purpose architectural registers ("GPRs") 632 and fixed-point rename buffers 634.

Moreover, FXUA 622 and FXUB 624 input a "carry bit" from a carry bit ("CA") register 642. FXUA 622, FXUB 624, CFXU 626, and LSU 628 output results (destination operand information) of their operations for storage at selected entries in fixed-point rename buffers 634. Also, CFXU 626 inputs and outputs source operand information and destination operand information to and from special-purpose register processing unit ("SPR unit") 640.

FPU 630 inputs its source operand information from floating-point architectural registers ("FPRs") 636 and floating-point rename buffers 638. FPU 630 outputs results (destination operand information) of its operation for storage at selected entries in floating-point rename buffers 638.

In response to a Load instruction, LSU 628 inputs information from data cache 616 and copies such information to selected ones of rename buffers 634 and 638. If such information is not stored in data cache 616, then data cache 616 inputs (through BIU 612 and system bus 611) such information from a system memory 660 connected to system bus 611. Moreover, data cache 616 is able to output (through BIU 612 and system bus 611) information from data cache 616 to system memory 660 connected to system bus 611. In response to a Store instruction, LSU 628 inputs information from a selected one of GPRs 632 and FPRs 636 and copies such information to data cache 616.

Sequencer unit 618 inputs and outputs information to and from GPRs 632 and FPRs 636. From sequencer unit 618, branch unit 620 inputs instructions and signals indicating a present state of processor 610. In response to such instructions and signals, branch unit 620 outputs (to sequencer unit 618) signals indicating suitable memory addresses storing a sequence of instructions for execution by processor 610. In response to such signals from branch unit 620, sequencer unit 618 inputs the indicated sequence of instructions from instruction cache 614. If one or more of the sequence of instructions is not stored in instruction cache 614, then instruction cache 614 inputs (through BIU 612 and system bus 611) such instructions from system memory 660 connected to system bus 611.

In response to the instructions input from instruction cache 614, sequencer unit 618 selectively dispatches the instructions to selected ones of execution units 620, 622, 624, 626, 628, and 630. Each execution unit executes one or more instructions of a particular class of instructions. For example, FXUA 622 and FXUB 624 execute a first class of fixed-point mathematical operations on source operands, such as addition, subtraction, ANDing, ORing and XORing. CFXU 626 executes a second class of fixed-point operations on source operands, such as fixed-point multiplication and division. FPU 630 executes floating-point operations on source operands, such as floating-point multiplication and division.

As information is stored at a selected one of rename buffers 634, such information is associated with a storage location (e.g. one of GPRs 632 or CA register 642) as specified by the instruction for which the selected rename buffer is allocated. Sequencer unit 618 copies information stored at a selected one of rename buffers 634 to its associated one of GPRs 632 (or CA register 642). Sequencer unit 618 directs such copying of information stored at a selected one of rename buffers 634 in response to "completing" the instruction that generated the information. Such copying is called "writeback."

As sequencer unit 618 copies information from one of rename buffers 638, such information is associated with one of FPRs 636. Sequencer unit 618 copies information stored at a selected one of rename buffers 638 to its associated one of FPRs 636 in response to signals from sequencer unit 618. Sequencer unit 618 directs such copying of information stored at a selected one of rename buffers 638 in response to "completing" the instruction that generated the information.

Processor 610 achieves high performance by processing multiple instructions simultaneously at various ones of execution units 620, 622, 624, 626, 628, and 630. Accordingly, processing of each instruction occurs as a sequence of stages, each being executable in parallel with stages of other instructions. Such a technique is called "pipelining." In a significant aspect of the illustrative embodiment, processing of an instruction occurs as six stages, namely fetch, decode, dispatch, execute, completion, and writeback.

In the fetch stage, sequencer unit 618 selectively inputs (from instruction cache 614) one or more instructions from one or more memory addresses storing the sequence of instructions discussed further hereinabove in connection with branch unit 620, and sequencer unit 618.

In the decode stage, sequencer unit 618 decodes up to four fetched instructions. In the dispatch stage, sequencer unit 618 selectively dispatches up to four decoded instructions to selected (in response to the decoding in the decode stage) ones of execution units 620, 622, 624, 626, 628, and 630 after reserving rename buffer entries for the dispatched instructions' results (destination operand information). In the dispatch stage, operand information is supplied to the selected execution units for dispatched instructions. Processor 610 dispatches instructions in order of their programmed sequence.

In the execute stage, execution units execute their dispatched instructions and output results (destination operand information) of their operations for storage at selected entries in rename buffers 634 and rename buffers 638 as discussed further hereinabove. In this manner, processor 610 is able to execute instructions out-of-order relative to their programmed sequence.

In the completion stage, sequencer unit 618 indicates an instruction is "complete." Processor 610 "completes" instructions in order of their programmed sequence.

In the writeback stage, sequencer 618 directs the copying of information from rename buffers 634 and 638 to GPRs 632 and FPRs 636, respectively. Sequencer unit 618 directs such copying of information stored at a selected rename buffer. Likewise, in the writeback stage of a particular instruction, processor 610 updates its architectural states in response to the particular instruction. Processor 610 processes the respective "writeback" stages of instructions in order of their programmed sequence. Processor 610 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 626) may require more than one cycle. Accordingly, a variable delay may occur between a particular instruction's execution and completion stages in response to the variation in time required for completion of preceding instructions.

Sequencer unit 618 includes a completion buffer 648 to track the completion of the multiple instructions which are being executed within the execution units. Upon an indication that an instruction or a group of instructions have been completed successfully, in an application specified sequential order, completion buffer 648 initiates the transfer of the results of those completed instructions to the associated general-purpose registers.

In addition, processor 610 also includes processor monitoring unit 64 connected to instruction cache 614, as well as other units in processor 610. Performance monitor unit 640, which in this illustrative embodiment is a software-accessible mechanism capable of providing detailed information descriptive of the utilization of instruction execution resources and storage control, monitors the operation of processor 610. Although not illustrated in FIG. 6, performance monitor unit 640 is coupled to each functional unit of processor 610 to permit the monitoring of all aspects of the operation of processor 610, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency.

Performance monitor unit 640 includes an implementation-dependent number (e.g., 2-8) of counters 641-642, labeled PMC1 and PMC2, which are utilized to count occurrences of selected events. Performance monitor unit 640 further includes at least one monitor mode control register (MMCR). In this example, two control registers, MMCRs 643 and 644 specify the function of counters 641-642. Counters 641-642 and MMCRs 643-644 are preferably implemented as SPRs that are accessible for read or write via MFSPR (move from SPR) and MTSPR (move to SPR) instructions executable by CFXU 626. However, in one alternative embodiment, counters 641-642 and MMCRs 643-644 may be implemented simply as addresses in I/O space. In another alternative embodiment, access to the control registers and counters occurs indirectly via an index register. This embodiment may be implemented, for example, in the IA-64 architecture in processors from Intel Corporation.

Additionally, processor 610 also includes interrupt unit 650, connected to instruction cache 614. Additionally, although not shown in FIG. 6, connections exists between interrupt unit 650 and other functional units within processor 610. Interrupt unit 650 receives signals from other functional units and initiates an action, such as starting an error handling or trap process. In these examples, interrupt unit 650 generates interrupts and exceptions that may occur during execution of a program.

Co-pending and commonly assigned U.S. patent application Ser. No. 10/757,256, entitled "Method and Apparatus for Autonomic Dectection of 'Chase Tail' Conditions and Storage of Instruct/Data in 'Chase Tail' Data Structure," filed on Jan. 14, 2004, which is hereby incorporated by reference, provides exemplary operations and uses of performance monitor counters 641-642 and the other elements shown in FIG. 6.

As mentioned above, the present invention improves upon known trace tools by providing functionality for utilizing a plurality of counters that count events associated with a plurality of metrics of interest during a single run of the application being traced. For example, the present invention provides functionality for obtaining count information from performance monitor counters 641-642 in response to the meeting of certain criteria, i.e. either time criteria or other types of criteria, during time-based or event-based profiling of the application.

During the tracing of the run of the application, performance monitor counters 641-642 count events associated with their respective metrics. The present invention provides trace tools with functionality such that in response to the occurrence of particular criteria associated with the counters, the trace tools output a trace record for the particular event type associated with the counter that meets the criteria. Alternatively, in response to the occurrence of particular criteria, the trace tool provides for obtaining the current counts of the various performance monitor counters, such as 641-642, and writing the counts to a trace record. A timer reinitializes the performance monitor counters 641-642 with counts meeting the criteria or obtained for writing to the trace record, and the process repeats.

As mentioned above, rather than implementing performance monitor counters 641-642 in hardware as depicted in FIG. 6, the present invention may make use of software-based counters or a combination of hardware and software-based counters. With regard to software-based counters, such counters may be, for example, in one or more interrupt handlers associated with the hooks placed in the application being traced. Thus, when an interrupt occurs in response to encountering a trace hook during execution of the application, a corresponding interrupt handler processes the interrupt. A counter associated with the interrupt handler increments for the particular event associated with the particular metric corresponding to the encountered trace hook. The trace tool may then obtain the counts of the various counters associated with the one or more interrupt handlers to thereby generate a trace record with the counters being reinitialized thereafter.

The criteria utilized for determining when to generate a trace record based on counts of events associated with a plurality of metrics may take a variety of forms. In one exemplary embodiment of the present invention, the trace tool samples several different performance monitor counters (either hardware-based or software-based) every $N_i$ events, where i is a performance monitor counter identifier and the N's can be different for each performance monitor counter. Each counter is set to its an initial value based on its capacity and the number of events $N_i$. For example, the counter may be set to an initial value based on the following equation:

$$\text{capacity}-N_i+1$$

After $N_i$ events of this type, e.g., number of instructions executed, number of cache misses, number of branch mispredictions, etc., the counter i overflows and generates an interrupt. In response to the generation of this interrupt, the trace tool generates a trace record. The trace record may include, for example, an event type identifier, a timestamp, a memory address associated with the instruction currently being executed by the application at the time of the interrupt, and the like.

Following generation of the trace record, the mechanism of the present invention resets the counter i to its initialized value and execution of the application under trace resumes. Using this methodology, the trace tool may generate a different number of trace records for each type of event associated with each metric of interest. The trace tool generates a number of trace records for a particular type of event and metric based on a combination of the frequency of that event type occurring and the value of $N_i$ chosen for that particular type of event.

In another exemplary embodiment, the mechanism of the present invention employs a timer for adjusting the values of the counters such that they will generate an interrupt on a next occurrence of an associated event type. In this alternative embodiment, a timer may be set for a predetermined interval at which the code will initiate resetting of the counters, or a subset of the counters, to their capacity. After the timer goes off and the counters are reset to their capacity, the timer resets.

On the next event of each type associated with the counters that have been set to their capacity, the associated counter will overflow and generate an interrupt. At this point, the trace tool outputs a trace record. Again, this trace record may include, for example, an event type identifier, a timestamp, a memory address associated with the instruction currently being executed by the application at the time of the interrupt, and the like.

Following generation of the trace record, the mechanism of the present invention resets the counter that initiated the generation of the trace record to its initialized value and execution of the application under trace resumes. Using this methodology, the trace tool generates the same number of trace records for each event type/metric regardless of their naturally occurring frequency in general. However, in other embodiments in which this methodology is combined with the previously described methodology, frequency of occurrence of particular events may be important for those metrics whose events have frequencies such that $N_i$ is met prior to the timer interval being met.

For both methodologies described above, trace records that are output may be identical. Thus, the same trace tool may use both methodologies together or interchangeably depending on the desired operation of the trace tool. In this way, the same post-processing may be performed on trace records generated by either methodology. This post-processing involves traversing the trace records generated by the trace tool, identifying the various event types, and generating separate profiles for each event type. In other words, the post-processing comprises first traversing the trace records to separate out the trace records into a plurality of sets of trace records based on event type. Then the post-processing generates a trace profile for the particular metric associated with that set of trace records based on each set of trace records in the plurality of sets of trace records. The post-processing mechanism then generates one or more reports comprising these various trace profiles for use by a human user.

Thus, for example, the post-processing mechanism generates a profile showing which modules consumed the most processor time, a profile showing which modules cause the most cache misses, etc. The generation of profiles from trace records is generally known in the art. An improvement with the post-processing performed by the present invention is the ability to discern the various event types to thereby generate separate profiles from trace records generated in a single trace of a single execution of an application. A single trace file, trace buffer, etc., may store these trace records. In addition, the post-processing mechanism may generate ratios, e.g., cache misses per second, in each module provided care is taken to account for the frequency of the occurrence of the events versus the chosen sampling rate.

The above methodology may be implemented, for example, in association with the tprof trace tool. In addition, other mechanisms for generating a trace record based on a counter, from a plurality of counters, having a value that meets a predetermined criteria may be used without departing from the spirit and scope of the present invention.

In yet another exemplary embodiment of the present invention, the trace tool may generate trace records having information about the change in counter values for each of the plurality of counters associated with different metrics, at the occurrence of each branch taken. For all chosen metrics, initial value of a corresponding counter (either hardware or software counter) at the start of tracing is stored as tracing of the application may be turned on and off independent of the start and termination of the application being traced.

Thereafter, at each branch taken, the mechanism of the present invention calculates a change in the values of each counter since a last observation. For each branch taken, the trace tool outputs a trace record in which this record contains all the metrics for the branch taken, including, for example, counters identifying cache misses, level 2 interventions, and TLB misses. The translation lookaside buffer (TLB) is a table in the processor that contains cross-references between the virtual and real addresses of recently referenced pages of memory. It functions like a "hot list" or quick-lookup index of the pages in main memory that have been most recently accessed.

When a cache miss occurs, this quick-lookup index allows for fetching data from an address in virtual memory. If the real-memory address of a desired page is not in the TLB, the real address must be determined by other means, thus causing a further delay. "TLB space" is conceptually the amount of accessible memory by looking up an address quickly in the TLB. The TLB it is not a physically distinct area of memory, but in effect, it does lead to a "faster" subset of main memory. TLB space is therefore equal to the number of addresses stored in the TLB times the page size. Page size is 4096 bytes or 4K. For a Pentium III processor with 64 addresses in the TLB, the TLB size is 64×4K or 256K.

The trace record may include, for example, an event type identifier, a change in the counter value, a memory address, and the like. Thus, if there are eight different counters counting events associated with eight different metrics, then each time a branch is taken, the trace tool outputs eight trace records identifying the change in the corresponding counter value since a last observation of the counter value.

The post-processing of trace records generated using this methodology involves constructing a separate callstack tree for each chosen metric. The post-processing operation first traverses the trace records to separate out trace records based on event type into a plurality of sets of trace records. Thereafter, the post-processing operation generates a separate callstack tree for the associated metric for each set of trace records in the plurality of sets of trace records. Co-pending and commonly assigned U.S. patent application Ser. No. 10/777,909, which is hereby incorporated by reference, provides an example of the generation of callstack trees from trace records.

Because a trace record is output for each metric at each branch taken, even if the change in the value of the counter associated with that metric is zero, the callstack trees for the various metrics will be identical in shape. This makes comparisons of callstack trees and generation or ratios among the metrics straightforward.

This embodiment of the present invention may be used, for example, in association with the itrace tool described previously. As mentioned above, the itrace tool generates a trace record each time a branch is taken. The mechanism of the present invention augments the itrace tool to generate a plurality of trace records at each branch taken with each trace record corresponding to a particular performance monitor counter associated with a metric of interest. In addition, the mechanism of the present invention allows for modifying the trace to identify the event type associated with the corresponding counter and the change in the counter value since a last observation of the counter value.

Regardless of which particular embodiment is utilized by an implementation of the present invention, it is necessary to perform symbolic resolution of the memory addresses stored in the trace records so as to provide a meaningful output to a user. Symbolic resolution translates addresses into symbolic names that have meaning to human users. Any symbolic resolution methodology may be used by the various embodiments of the present invention without departing from the spirit and scope of the present invention. Commonly assigned U.S. Pat. No. 6,766,511, entitled "Apparatus and Method for Performing Symbolic Resolution of Modules Using Static Representations of a Trace," issued to Berry et al. on Jul. 20, 2004, which is hereby incorporated by reference, provides one exemplary symbolic resolution mechanism/methodology. Alternatively, the symbolic resolution may be performed using a merged symbol file as described, for example, in commonly assigned and co-pending U.S. patent application Ser. No. 09/613,190, entitled "Apparatus and Method for Cataloging Symbolic Data for Use in Performance Analysis of Computer Programs," filed on Jul. 10, 2000, which is hereby incorporated by reference.

Figure 7:
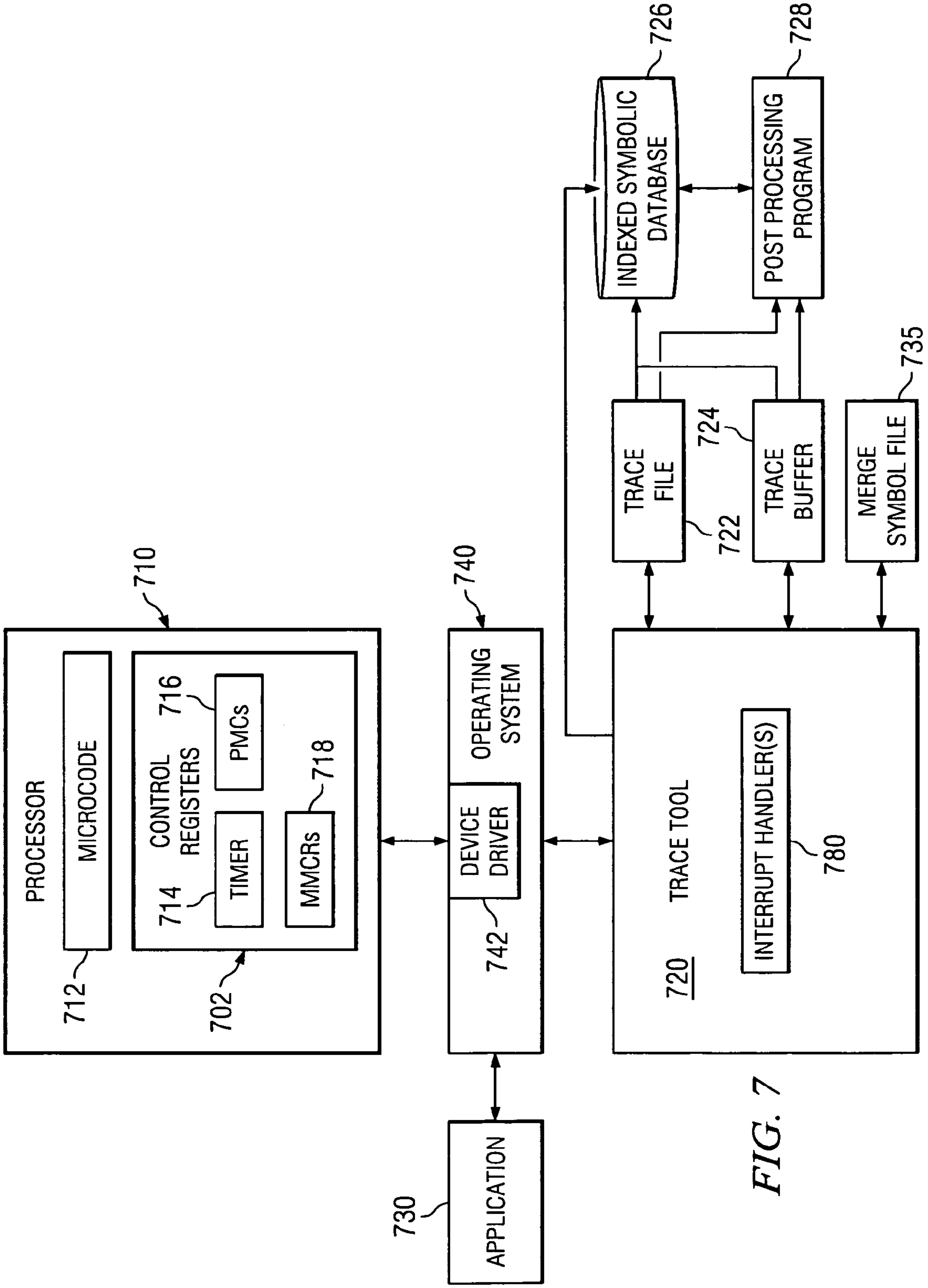
FIG. 7 is a diagram illustrating primary operational components according to one exemplary embodiment of the present invention.

With reference now to FIG. 7, a diagram illustrating primary operational components according to one exemplary embodiment of the present invention is depicted. During the initialization phase of a performance tracing program, such as initialization phase 500 in FIG. 5, trace tool 720 may instruct operating system 740 regarding the metrics of interest during the trace of the application. Device driver 742 of operating system 740 may communicate with microcode 712 of processor 710 to set the values of control registers 702 to identify the metrics of interest and the counters associated with those metrics. For example, device driver 742 may instruct microcode 712 to set the values in MMCRs 718 to identify the various event types associated with corresponding PMCs 716. PMCs 716 may count the occurrence of events up to a maximum counter value. When the counter reaches a maximum value and another event of that type occurs, the counter will overflow thereby generating an interrupt to operating system 740.

In some embodiments, the mechanism of the present invention provides timer 714 with a corresponding time interval. Timer 714 increments with every time step until reaching a time interval, at which time the timer will generate an interrupt to operating system 740.

After initialization of MMCRs 718, PMCs 716, and timer 714, execution and tracing of application 730 may commence. As application 730 is executing and instructions of application 730 are executed by processor 710, microcode 712 identifies various event types and increments corresponding PMCs 716. When a PMC 716 or timer 714 overflows, this generates an interrupt, which is sent to operating system 740. Operating system 740 calls a corresponding interrupt handler 780 associated with trace application 720.

Interrupt handler 780 may cause one or more trace records to be generated in response to the interrupt. In an alternative embodiment, as described above, interrupt handler 780 may cause the values of PMCs 716 to be reset to their capacity. The mechanism of the present invention stores the trace records in trace file 722 and/or trace buffer 724. The trace record corresponds to a particular event type associated with a counter. As mentioned above, depending on the particular embodiment being implemented, the trace tool may generate a trace record for the event type corresponding to the counter that generated the interrupt or for all of the event types and counters.

Post-processing program 728 processes the trace records in trace file 722 and/or trace buffer 724 to generate separate profiles for each event type corresponding to the metrics of interest. This post-processing may involve traversing each trace record to generate sets of trace records based on event type. Thereafter, the post-processing uses each set of trace records to generate profiles and/or callstack trees for output. This process may also use symbolic data to perform address to name translation, i.e. symbolic resolution, such as symbolic resolution performed using merged symbol file 735.

In the special case when the trace tool generates a trace on a simulated machine, while it is possible to execute post-processing program 728 on the same simulated machine, it is not desirable to do so because simulation is typically orders of magnitude slower than real hardware. To accomplish post processing faster, we can transfer trace file 722 to a separate, real machine and execute post-processing program 728 there. However, in some real environments, accomplishing the first steps in post processing, namely creating merge symbol file 735 and indexed symbolic database 726 on a different platform from where the trace was generated, is difficult. This is because in some environments, for example in the Linux operating system, trace file 722 contains the names of modules and the address at which a module was loaded, but not the addresses of symbols within the module (for example, the trace contains the address of a program, but not the addresses of subroutines within the program). In these environments, post-processing program 728 looks inside the module where names of individual routines and their corresponding address may be found. If a different machine performs the post-processing operation, the module may not exist, or worse, a different module of the same name may be present.

Anticipating this difficulty, while creating trace file 722 on a simulated machine, trace tool 720 adds an extra directory prefix to the name of all modules it encounters. For example, if the name of a module is /usr/bin/program_name (module names are usually recorded with their full file system pathname), the trace tool records its address and the name /simtree/usr/bin/program_name in the trace file. Later, before beginning to post process on a real machine, we create a new root directory /simtree, and copy or mount the disk image from the simulated environment to this new directory. Then when the name /simtree/usr/bin/program_name is encountered in the local copy of trace file 722, post-processing program 728 can look in local directory /simtree/usr/bin, find a binary image of program_name, and look inside it to find internal symbols.

U.S. patent application Ser. No. 09/613,190, "Apparatus and Method for Cataloging Symbolic Data for Use in Performance Analysis of Computer Programs", incorporated by reference above, provides a method for post-processing performance trace data recorded in trace buffer 724 or trace file 722. The post-processing generates a merged symbol file, such as merge symbol file 735, for a computer program, or application, under trace. Merged symbol file 735 comprises symbolic data for modules obtained from map files, debug files, non-stripped versions of modules, and other symbolic data files. The merged symbol file contains information useful in performing symbolic resolution of address information in trace files for each instance of a module, such as checksum, timestamp, fully qualified path to the module, length of the module, etc.

During post processing of the trace information generated by a performance trace of a computer program, the post-processing operation compares the symbolic information stored in merged symbol file 735 to the trace information stored in trace file 722. The trace information includes information identifying the modules that were called during the trace of the computer application. The post-processing operation uses this trace information, which may be obtained using the hardware thread tracking mechanisms previously described, and the merged symbol file to produce reports. The correct symbolic information in merged symbol file 735 for the modules used in the trace is identified based on a number of validating criteria.

The post-processing operation may then store the correct symbolic information for the required modules as an indexed symbolic database, for example, indexed symbolic database 726, which is indexed using process identifiers and address identifiers. The post-processing operation may store the indexed database of symbolic information as a separate file or as a separate portion of a trace file for the computer application. The post-processing operation may then use the indexed symbolic database 726 to resolve address information into corresponding symbolic information when providing the trace information for use by a user.

As described above, the symbolic information provides symbolic data for loaded modules/processes, i.e. called module or processes, of the application under trace. As a result of the symbolic resolution, either trace tool 720 or post-processing program 728 generates indexed symbolic database 726 for the loaded/called modules/processes. The indexed database entries may be indexed based on any searchable value. In a preferred embodiment, the indexed database is indexed based on the process identifier (pid) and the segment load address, however, other searchable indices may be used without departing from the spirit and scope of the present invention.

Once the post-processing operation generates indexed symbolic database 726, trace tool 720 or post-processing application 728 may search indexed symbolic database 726 for symbolic information that matches the process identifier (pid) and the address of the method/routine called or returned by each thread. When a match is found, the present invention generates a call sequence using symbolic data that represents the computer program flow.

The trace records in trace file 722 and/or trace buffer 724 may take different forms depending on the particular embodiments of the present invention implemented. FIG. 8A illustrates an example of the trace records generated for exemplary embodiments of the present invention in which the trace record is generated in response to a counter overflow generating an interrupt.

As shown in FIG. 8A, the trace record includes event type 810 corresponding to the event types counted by the corresponding counter, timestamp 820 for the occurrence of the interrupt causing the generation of the trace record, and memory address 830 for the instruction executed by the application being traced when the interrupt was generated. The present invention uses event type 810 to separate trace records into sets of trace records based on event type. Post-processing mechanisms use timestamp 820 to generate trace profiles, as is generally known in the art. Memory address 830 is the basis for symbolic resolution with regard to this trace record.

FIG. 8B illustrates an exemplary trace record for an embodiment of the present invention in which trace records are generated responsive to an interrupt. As shown in FIG. 8B, the trace records include event type 840, change value 850 that identifies a change in counter value for the counter corresponding to the trace record, and memory address 860. Event type identifier 840 and memory address 860 are similar to the trace record shown in FIG. 8A. Change value 850 is the difference between a current value of the counter and a previous value of the counter in a previous trace record for that counter or a stored initial value of the counter. As discussed previously, with this embodiment, the trace tool writes a separate trace record for each counter when an interrupt occurs.

FIG. 8C illustrates an exemplary trace record for an embodiment of the present invention in which a trace tool generates trace records for every branch taken. As shown in FIG. 8C, the trace records include memory address 880 that identifies the address from which the branch is taken, memory address 882 that identifies the branch-to address, and change values 884-888 that identify changes in counter values for the counter corresponding to the trace record. Change values 884-888 are the differences between a current value of the counter and a previous value of the counter in a previous trace record for that counter or a stored initial value of the counter. Alternative implementations may write one or more separate trace records that indicate the metrics that have changed. Thus, with the mechanisms of the present invention, trace tools generate trace records for a plurality of different metrics during a single run of an application and write these trace records to a single trace file and/or trace buffer, which are later extracted out into separate sets of trace records for use in generating separate trace profiles or callstack trees for each metric of interest. Thus, the mechanism of the present invention allows for generating multiple trace profiles and callstack trees for multiple metrics using only a single run of an application.

For situations in which application runs may be require an extensive amount of time, such as with system simulation, the present invention results in a great reduction in run time to obtain all of the performance information required for the various metrics of interest. That is, for example, with a complex computer program capable of simulating all hardware aspects of an entire computer system, including details of processor units, caches, buses, memory, multiprocessors, etc., a run of such a computer program may require many days to complete. With conventional tracing tools, multiple runs of this complex computer program would be required in order to obtain all of the performance information necessary to properly evaluate the operation of the application. With the present invention, only a single run of the computer program is necessary in order to obtain all of the required performance information for the plurality of metrics of interest.

Figure 9:
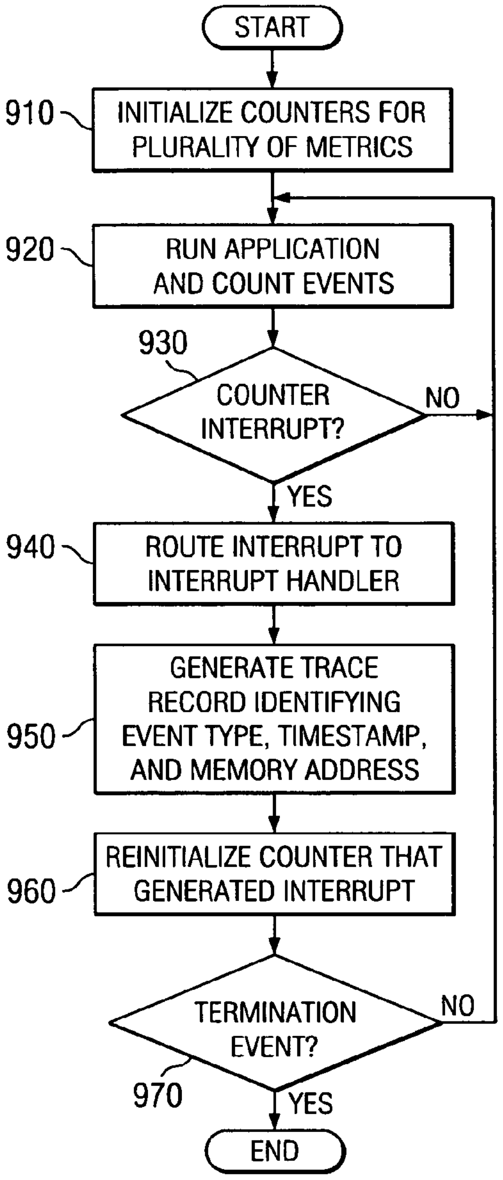
FIG. 9 is a flowchart outlining an exemplary operation of the present invention in which trace records are generated in response to a counter generated interrupt.
Figure 11:
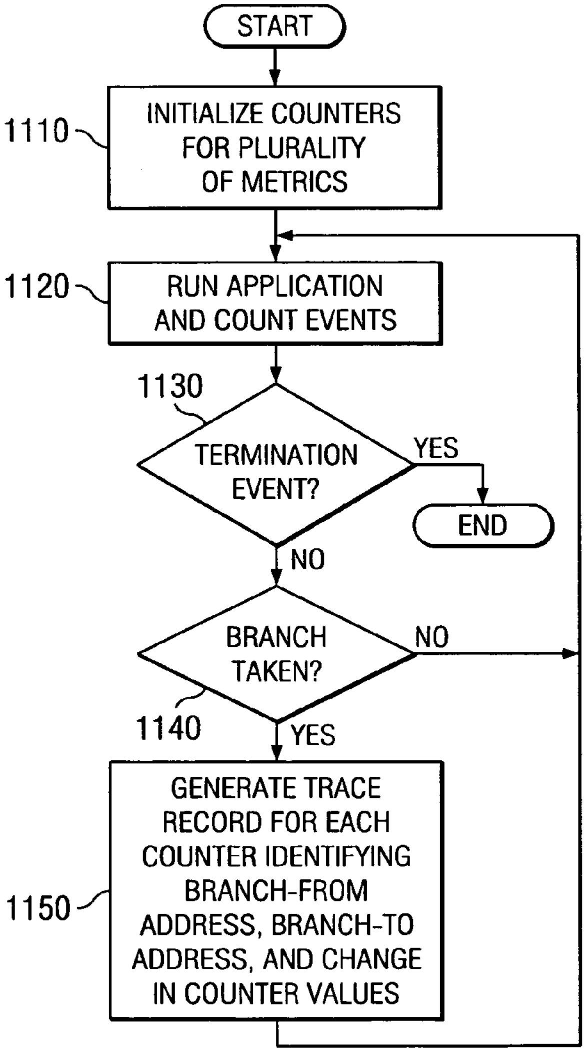
FIG. 11 is a flowchart outlining an exemplary operation of one exemplary embodiment of the present invention when generating trace records for each counter at every branch taken in an application under trace.
Figure 10:
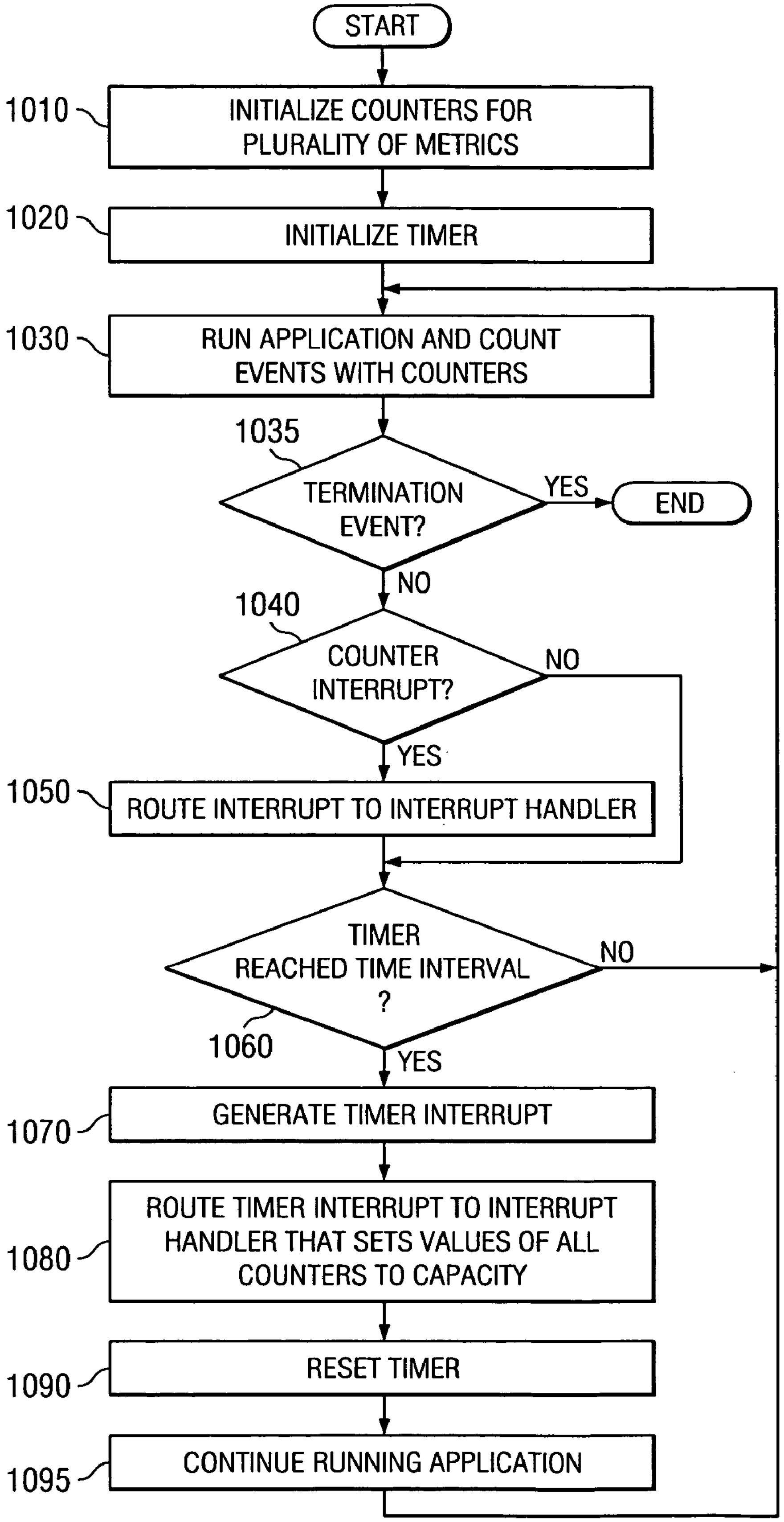
FIG. 10 is a flowchart outlining an exemplary operation of one exemplary embodiment of the present invention in which counter values are set to their capacity in response to a timer interrupt.

FIGS. 9-11 are flowcharts outlining exemplary operations of exemplary embodiments of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 9 is a flowchart outlining an exemplary operation of the present invention in which a trace tool generates trace records in response to a counter generated interrupt. As shown in FIG. 9, the operation starts by initializing the counters for the various metrics of interest (step 910). As mentioned above this initialization, in one exemplary embodiment, may involve setting the counter initial values a value based on their capacity and an interval number of events between trace records.

Thereafter, the application runs with counters counting events during the running of the application (step 920). A determination is made as to whether a counter has overflowed and generated an interrupt (step 930). If so, the interrupt is routed to an appropriate interrupt handler (step 940) that generates a trace record identifying the event type, the timestamp and memory address corresponding to the interrupt (step 950). The counter generating the interrupt is then reinitialized (step 960) and a determination is made as to whether a termination event occurred (step 970), e.g., termination of the trace. If a termination event has not occurred, the operation returns to step 920. Otherwise, the operation ends.

FIG. 10 is a flowchart outlining an exemplary operation of one exemplary embodiment of the present invention in which counter values are set to their capacity in response to a timer interrupt. As shown in FIG. 10, the operation starts by initializing the counters to count events associated with metrics of interest (step 1010). A timer is initialized (step 1020) and the application runs (step 1030) with the counters counting events as they occur.

A determination is made as to whether a termination event has occurred (step 1035), e.g., termination of the trace. If a termination event occurred, then the operation terminates. Otherwise, a determination is made as to whether a counter generated a counter interrupt due to an overflow of the counter based on the occurrence of events during the running of the application (step 1040). If the counter interrupt exists, the interrupt is routed to an appropriate interrupt handler which generates a trace record (step 1050). Thereafter, or if the counter interrupt does not exist, a determination is made as to whether the timer reached a predetermined time interval (step 1060). If not, the operation returns to step 1030 and continues to run the application.

If the timer reached a predetermined time interval, an interrupt is generated (step 1070). The interrupt is routed to an appropriate interrupt handler which then sets the values of all of the counters to their capacity (step 1080). The timer resets (step 1090) and the application continues to run (step 1095). The operation then returns to step 1030.

FIG. 11 is a flowchart outlining an exemplary operation of one exemplary embodiment of the present invention when generating trace records for each counter at every branch taken in an application under trace. As shown in FIG. 11, the operation starts by initializing counters for counting events associated with metrics of interest (step 1110). Thereafter, the application starts to run with the counters incrementing in response to the occurrence of their corresponding events (step 1120). A determination is made as to whether a termination event occurred (step 1130). If a termination event has occurred, the operation terminates. Otherwise, a determination is made as to whether a branch has been taken (step 1140).

If a branch has been taken, the trace tool generates a trace record for each counter (step 1150). If a branch has not been taken, the operation returns to step 1120.

Thus, the present invention provides an improved mechanism for tracing of applications that permits multiple metrics to be monitored and performance data collected for a plurality of metrics of interest during a single run of an application. The present invention provides improvements to known time-based and event-based trace tools, such as tprof and itrace, that permit these tools to be used with large and complex computer programs without requiring multiple runs of these complex computer programs thereby reducing costs in validation, debugging, and the like.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, having at least a processor, for profiling program execution on the data processing system, the method comprising:

initializing, by the processor, a plurality of counters in a performance monitor unit residing in the processor to count a plurality of events, wherein each event is associated with a different metric, and wherein each counter is associated with one of the different metrics;

counting, by each counter, occurrences of events that are associated with each respective counter during execution of a computer program that includes a plurality of branches;

responsive to each determination that one of the plurality of counters has generated an interrupt, rerouting, by the processor, the interrupt to an interrupt handler, wherein the interrupt handler generates a separate first trace record in response to each generated interrupt, further wherein each first trace record corresponds to only one interrupt and is associated with only one counter, and further wherein each first trace record includes trace information, wherein the trace information includes an event type that identifies one of the plurality of metrics;

responsive to each determination that one of the plurality of branches has been taken during the execution of the computer program, generating a second trace record for the one of the plurality of branches taken, wherein the counting continues without resetting each counter after each one of the plurality of branches has been taken, and wherein the second trace record includes a change in a value of each counter since a last one of the plurality of branches was taken, and wherein the second trace record includes information about the one of the plurality of branches that was taken; and generating profiles for a trace, wherein the profiles differentiate the first trace records using the event type that is included in each one of the plurality of first trace records.

2. The method of claim 1, further comprising:

responsive to the one of the plurality of counters generating an interrupt, reinitializing the one of the plurality of counters.

3. The method of claim 1, wherein the initializing step includes setting initial values for the one of the plurality of counters to a value based on the capacity of each one of the plurality of counters.

4. The method of claim 1, wherein an interrupt is generated when a maximum value of each one of the plurality of counters is reached.

5. The method of claim 1, wherein counter values for the plurality of counters are reset to a maximum value when a particular time interval is reached.

6. The method of claim 1, wherein the generating step is performed by a timer based profiling tool.

7. The method of claim 6, wherein an interrupt is generated in response to one of the plurality of counters overflowing.

8. The method of claim 6, wherein the timer based profiling tool is a tprof event-based trace tool.

9. The method of claim 1, wherein the different metrics comprise L1 cache misses, cycles, instructions completed, and TLB misses.

10. The method of claim 1, wherein the different metrics comprise counts of executions of selected modules, counts of page faults, and specific file accesses.

11. The method of claim 1, wherein the generating step includes using an additional directory name to distinguish a first name space on a simulated system being profiled from a second name space on a system on which the trace is reduced.

12. A data processing system for profiling program execution, comprising:

a processor;

a plurality of counters in a performance monitor unit residing in the processor, wherein the plurality of counters are initialized to count a plurality of events, wherein each event is associated with a different metric, and wherein each counter is associated with one of the different metrics;

each counter counting occurrences of events that are associated with each respective counter during execution of computer program that includes a plurality of branches;

responsive to each determination that one of the plurality of counters has generated an interrupt, the processor rerouting the interrupt to an interrupt handler, wherein the interrupt handler generates a separate first trace record in response to each generated interrupt, further wherein each first trace record corresponds to only one interrupt and is associated with only one counter, and further wherein each first trace record includes trace information, wherein the trace information includes an event type that identifies one of the plurality of metrics;

responsive to each determination that one of the plurality of branches has been taken during the execution of the computer program, generating means for generating a second trace record for the one of the plurality of branches taken, wherein the counting continues without resetting the plurality of counters after each one of the plurality of branches has been taken, and wherein the second trace record includes a change in a value of each one of the plurality of counters since a last one of the plurality of branches was taken, and wherein the second trace record includes information about the one of the plurality of branches that was taken; and generating means for generating profiles for a trace, wherein the profiles differentiate the plurality of first trace records using the event type that is included in each one of the plurality of first trace records.

13. The data processing system of claim 12, further comprising:

reinitializing means for reinitializing the one of the plurality of counters responsive to the one of the plurality of counters generating an interrupt.

14. The data processing system of claim 12, wherein initial values of the plurality of counters are set to a value based on the capacity of each one of the plurality of counters.

15. The data processing system of claim 12, wherein an interrupt is generated when a maximum value of each one of the plurality of counters is reached.

16. The data processing system of claim 12, wherein counter values for the plurality of counters are reset to a maximum value when a particular time interval is reached.

17. The data processing system of claim 12, wherein the generating means includes using an additional directory name to distinguish a first name space on a simulated system being profiled from a second name space on a system on which the trace is reduced.

18. A computer program product stored in a computer recordable-type medium for profiling program execution, comprising:

first instructions for initializing, by the processor, a plurality of counters in a performance monitor unit residing in the processor to count a plurality of events, wherein each event is associated with a different metric, and wherein each counter is associated with one of the different metrics;

second instructions for counting, by each counter, occurrences of events that are associated with each respective counter during execution of a computer program that includes a plurality of branches;

responsive to each determination that one of the plurality of counters has generated an interrupt, third instructions for rerouting, by the processor, the interrupt to an interrupt handler, wherein the interrupt handler generates a separate first trace record in response to each generated interrupt, further wherein each first trace record corresponds to only one interrupt and is associated with only one counter, and further wherein each first trace record includes trace information, wherein the trace information includes an event type that identifies one of the plurality of metrics;

responsive to each determination that one of the plurality of branches has been taken during the execution of the computer program, fifth instructions for generating a second trace record for the one of the plurality of branches taken, wherein the counting continues without resetting each counter after each one of the plurality of branches has been taken, and wherein the second trace record includes a change in a value of each counter since a last one of the plurality of branches was taken, and wherein the second trace record includes information about the one of the plurality of branches that was taken; and sixth instructions for generating profiles for a trace, wherein the profiles differentiate the first trace records using the event type that is included in each one of the plurality of first trace records.

* * * * *

UNITED STATES PATENT AND TRADEMARK OFFICE

CERTIFICATE OF CORRECTION

PATENT NO. : 7,640,539 B2
APPLICATION NO. : 11/104257
DATED : December 29, 2009
INVENTOR(S) : Alexander, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Ninth Day of November, 2010

David J. Kappos

David J. Kappos
*Director of the United States Patent and Trademark Office*